United States Patent [19]

Komin

[11] Patent Number: 4,680,056

[45] Date of Patent: Jul. 14, 1987

[54] CARBONLESS PAPER SOLVENT UTILIZING TRIISOPROPYLTOLUENE

[75] Inventor: Andrew P. Komin, Wichita, Kans.

[73] Assignee: Koch Industries, Inc., Wichita, Kans.

[21] Appl. No.: 821,983

[22] Filed: Jan. 23, 1986

[51] Int. Cl.$^4$ .............................................. C09D 11/00

[52] U.S. Cl. ...................................... 106/21; 427/146; 427/150; 427/151; 430/138

[58] Field of Search .................. 106/21; 427/146, 150, 427/151; 430/138

[56] References Cited

U.S. PATENT DOCUMENTS 3,429,827 2/1969 Ruus .................................... 430/138

4,124,227 11/1978 Ruus .................................... 428/323

*Primary Examiner*—Amelia B. Yarbrough

*Attorney, Agent, or Firm*—Kokjer, Kircher, Bradley, Wharton, Bowman & Johnson

[57] ABSTRACT

A carbonless paper solvent, a method of solubilizing a chromogenic material, and a recording sheet, all utilizing triisopropyltoluene, are the subject of the present invention. Triisopropyltoluene may be obtained by the alkylation of toluene and the resulting product will normally contain the 2,3,5, the 2,4,5 and the 2,4,6 isomers. The triisopropyltoluene may be combined with other known dye solvents such as alkylated naphthalenes, diarylmethanes and alkylated biphenyls to present a carbonless paper solvent or it may be utilized alone. The triisopropyltoluene will normally be present in a quantity of at least 40% by weight of the total solvent. A recording sheet may be formed by a paper which is coated with a continuous layer of microcapsules containing chromogenic marking material and a solvent comprising triisopropyltoluene.

10 Claims, No Drawings

CARBONLESS PAPER SOLVENT UTILIZING TRIISOPROPYLTOLUENE

This invention relates generally to dye solvents, and more particularly, to a carbonless paper solvent comprising triisopropyltoluene. This compound may be utilized alone or in combination with other known clear odorless liquids to provide a solvent useful for solublilizing colorless chromogenic dye precursor materials and cross linking agents utilized in the production of microcapsules for pressure sensitive record material.

Marking systems that depend upon localized contact between a chromogenic compound and a color developing substance to produce a visible indicia carried by a support such as paper have found wide spread acceptance in a variety of commercial applications. Such systems are generally referred to as carbonless paper systems and the solvents utilized are known in the industry as carbonless paper solvents. One example is a transfer copy system which has been devised using a dye intermediate material dissolved in an oil and encapsulated in order to form microscopic capsules. The microcapsules isolate the dye intermediate material from an electron accepting material of the Lewis acid type, which is provided on a separate receiving sheet. Upon the application of localized pressure, the microcapsules are ruptured and the dye intermediate is released and transferred to the receiving sheet where a distinctive mark results. Pressure sensitive mark forming systems of this type are shown and described in U.S. Pat. Nos. 3,418,656 and 3,418,250, both of which are incorporated herein by reference.

One of the most commonly used dye precursor materials is crystal violet lactone which produces an instant blue image on an acidic co-reactant material, such as acidic clays, phenols, resorcinols and the like. For years, polychlorinated biphenyls were widely used as dye precursor solvents although the use of these materials has been discontinued in recent years. U.S. Pat. No. 3,016,308 to Macaulay discloses the utilization of a mixture of chlorinated biphenyl, amyl biphenyl, and amyl naphthalene as a solvent for crystal violet for use in an encapsulated marking liquid in a coated record sheet. Other known solvents for dye precursor materials include alkylated naphthalenes such as are shown in U.S. Pat. No. 3,806,463, diarylmethanes, and polyalkylated biphenyl compounds such as those disclosed in U.S. Pat. No. 4,287,074.

There are several known types of microencapsulation processes which have been employed in the manufacture of carbonless paper marking systems. The processes disclosed in U.S. Pat. Nos. 3,016,308 and 3,712,507 are applicable to the present invention. Other acceptable processes for encapsulating color precursors are disclosed in U.S. Pat. Nos. 3,429,827 and 3,578,605.

A requirement for any solvent to be utilized in a carbonless paper system is that the material be substantially colorless, have a low vapor pressure, be substantially odorless, exhibit superior solvency, have an acceptably low freezing point and be characterized by a low viscosity. While it has been known in the past that certain carbonless paper solvents also exhibit good dielectric properties, there are many functional dielectrics which are completely unacceptable as carbonless paper solvents.

Triisopropyltoluene (TIPT) is a previously known compound which may be obtained by the alkylation of toluene. Japanese Patent No. 192(57)-7109 discloses the utilization of triisopropyltoluene as a dielectric. The prior art utilizations of TIPT do not suggest that it possesses the capability of serving as a carbonless paper solvent.

It has now been found that triisopropyltoluene alone or in combination with other known solvents functions as a highly desirable carbonless paper solvent. This solvent offers economic advantages over other known carbonless paper solvents and yet it has physical properties comparable or superior to other known solvents. A particularly noteworthy advantage of TIPT is that it is virtually completely odorless, a desirable property which it is often necessary to compromise when utilizing other known solvents.

Triisopropyltoluene may be obtained from the alkylation of toluene in the presence of aluminum chloride catalyst according to the following reaction:

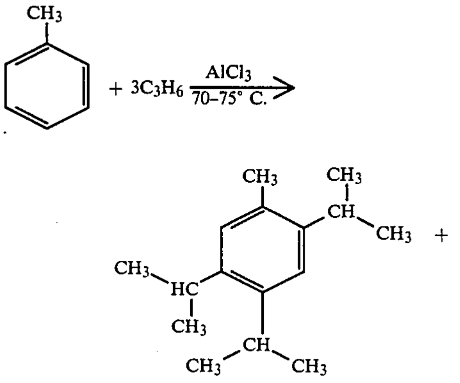

2,4,5-triisopropyltoluene

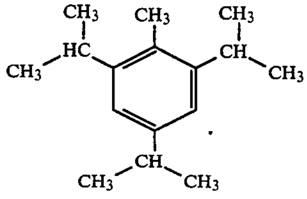

2,4,6-triisopropyltoluene

The reaction proceeds in the presence of approximately 0.75% by weight catalyst, based on the weight of the toluene, with sufficient hydrogen chloride being added to maintain acidic condition. The reaction is preferably carried out over a period of approximately two hours with cooling as necessary to maintain the temperature in the 70° to 75° C. range. While the 2,4,6 and 2,4,5 isomers predominate the reaction product, some of the 2,3,5 isomer may also be present. A typical range for these three isomers in the product is: 2,4,6 35–60% by weight; 2,4,5 25–45% by weight; and 2,3,5 0–45% by weight.

The physical properties of TIPT in comparison with other known carbonless paper solvents are set forth in Table 1.

TABLE 1

| | Physical Properties of TIPT and Other Known CPS | | | | | |
|---|---|---|---|---|---|---|
| | TIPT[a] | TIPT[b] | TIPT[c] | TIPT[d] | (1) | (2) |
| Specific Gravity 60° F./60° F. | 0.8755 | 0.8753 | 0.8725 | 0.8775 | 0.8654 | 0.7927 |
| K. Viscosity @100° F. cST | 5.43 | 5.24 | 5.41 | 5.50 | 4.7 | 2.1 |
| Mixed Aniline Point, °C. | 35.7 | 36.0 | 36.8 | 35.4 | 40.3 | 76[e] |
| Kauri-Butanol | 50.9 | 50.2 | 51.6 | 49.7 | 40.2 | 29 |
| Pour Point, °F. | −60 | — | −60 | −55 | −75 | −60 |
| Refractive Index Index $N_D^{20}$ | 1.4992 | — | 1.4973 | 1.4998 | — | 1.428 |
| Isomer A %[3] (2,4,6-TIPT) | 42.55 | 50.83 | 96.98 | 1.33 | | |
| Isomer B %[3] (2,4,5-TIPT) | 37.66 | 47.49 | 2.75 | 57.73 | | |
| Isomer C %[3] (2,3,5-TIPT) | 19.79 | 1.68 | 0.27 | 40.94 | | |

[a]Isomer A + B + C mixture, typical commercial product
[b]Isomer A + B mixture
[c]Isomer A
[d]Isomer B + C
[e]Aniline point
(1) Dodecylbenzene, source Union Carbide Company
(2) Kerosene, low aromatic, source Exxon Corp.
(3) Gas Chromatograph TIPT Isomer Distribution (Normalized)

Odor tests were conducted on the solvent which is the subject of the invention according to the following procedure: A piece of absorbent paper was wetted with TIPT and placed in each of six sealed containers. Each container was kept sealed for several minutes until the vapors from the evaporating solvent reached equilibrium with the air inside the container. Six disinterested persons were blindfolded and asked to rate the odoriferousness of the containers upon removal of the lids. Rating was done on a scale of 0 to 10 with zero being completely odorless (e.g. fresh untreated water) and 10 being unacceptably pervasive (e.g. gasoline). The TIPT of the present invention was rated between zero and one by all six odor judges.

Dyes utilized in conjunction with carbonless marking systems are generally from the chemical class nitroso, disazo or polyazo. Fluoran compounds of the type disclosed in U.S. Pat. No. 3,920,510 are also useful as carbonless paper dyes. A typical procedure for solvating chromogenic materials of the type that are useful in conjunction with the present invention is set forth in Example VII of U.S. Pat. No. 4,124,227 previously mentioned and incorporated in the present disclosure by reference.

While the solvent of the present invention can be utilized alone to dissolve chromogenic materials, it will more often be used with another solvent. In Example 7 of U.S. Pat. No. 4,124,227 two solutions, A and B, are prepared although the same solvent is utilized for both. Following current practice in the industry, a typical approach would be to utilize a first solvent for solution A and a second solvent for solution B. The solvent for solution A, which must have superior solvency for the chromogenic material is sometimes referred to as the primary solvent. The solvent for solution B which does not have to have the same level of solvency but still must have high solvency, be non-toxic, compatible with the first solvent and relatively clear and odorless, is sometimes referred to as the secondary solvent. The advantage of utilizing the secondary solvent is that it is typically a more economical material. TIPT of the present invention could be substituted for the specified solvent of solution B in Example 7 of the referenced patent to provide a workable carbonless paper solvent system.

Another and further example of a carbonless paper solvent utilizing the TIPT of the present invention is set forth below:

EXAMPLE

To 100 parts mixed diisopropyl naphthalenes was added 8 parts leuco black dye of the alkylaminofluorane type. The mixture was warmed to 100° F. and agitated to give complete solution. To the resultant solution was added 100 parts of mixed triisopropyltoluene isomers (TIPT) and the entire solution allowed to equilibrate. This solution, added to 150 parts aqueous solution containing 35 parts gum arabic, gave on agitation a stable suspension which, upon addition of 200 parts of a 12% gelatine solution, sufficient sodium hydroxide to maintain the pH at 9 and additional water (800 parts) gave a suspension which. upon further addition of acetic acid to pH=4–4.5 under agitation yielded a suspension of oil micro-droplets. Further addition of formaldehyde solution (4 parts $CH_2O$) and subsequent adjustment of pH to 9.65 caused hardening of the microdroplets to capsules. These microcapsules when applied by standard techniques to paper at a rate of about 5 gm/m$^2$, and dried, gave paper ready for acid development by clays or by acid-resins, when broken by contact of a stylus.

Typical systems in which the solvent of the present invention would be utilized include those where the primary solvent is an alkylated naphthalene such as diisopropylnaphthalene as disclosed in U.S. Pat. No. 3,806,463; diarylmethanes such as phenylxylylmethane; and alkylated biphenyl compounds such as mono and di-secbutylbiphenyl as disclosed in U.S. Pat. No. 4,287,074.

When utilizing the solvent of the present invention in combination with one of the aforementioned solvents TIPT will typically be present in a quantity of 40 to 70% by weight of the total solution. Because of the superior solvency of TIPT and its odorless characteristics that approach those of other known accepted solvents, it may be utilized in a much higher quantitative ratio than other known so-called secondary solvents.

While the particular quantitative isomer distribution in a given solution of TIPT is not critical, in the preferred form of the invention 2,4,6-TIPT comprises at least forty percent of the TIPT solvent. The 2,4,5 isomer is present in a quantity of at least 25% by weight of the total solvent. The 2,3,5 isomer will normally be present in quantities of from 0 to 40% by weight but preferably less than 20%.

Manifestly, the invention herein disclosed contemplates a method of solubilizing a chromogenic material by dissolving the material in TIPT. While other solvents may be utilized in conjunction with TIPT, the latter is preferably at least 40% by weight of the total solution and will normally constitute between 40–70% by weight. While various TIPT isomers can be utilized in the method, it is preferable to have at least 40% by weight of the 2,4,6 isomer and between 40–90% by weight of the 2,4,6 and 2,4,5 isomers combined.

In another aspect of the invention, a recording sheet is contemplated which includes a support for carrying a written or printed indicia which support will normally be a paper product of the type well known to those skilled in the art. The paper will have coated thereon a continuous layer of microcapsules containing a chromogenic substance and a solvent for the substance with the solvent comprising TIPT. Other solvents may be utilized in conjunction with TIPT on the recording sheet of this invention, although TIPT will normally comprise at least 40% of the total solvent and preferably between 40–70% of the total solvent (by weight). Other solvents which can be utilized in conjunction with TIPT in the recording sheet of the invention include one or more members of the group comprising alkylated naphthalenes, diarylmethanes, and alkylated biphenyls. While various isomers of TIPT can be utilized, it is preferable that the TIPT comprises primarily the 2,4,5 and 2,4,6 isomers. Normally, these isomers will comprise 40% to 90% by weight of the total quantity of TIPT utilized.

By utilizing the solvent of the present invention, it may replace a relatively large quantity of the most commonly used primary solvents and in doing so will actually improve the odorlessness of the overall solvent. The reason for this is that TIPT actually has less odor than some of the primary solvents which it is replacing. This is achieved while still maintaining the desirable properties of high solvency, low viscosity, low vapor pressure and relatively low freezing point.

I claim:

1. A solvent for dye used in pressure sensitive copying paper comprising (a) one or more members of the group comprising alkylated napthalenes, diarylmethanes and alkylated biphenyls and (b) triisopropyltoluene.

2. A solvent as called for by claim 1, wherein said triisopropyltoluene is present in a quantity of at least about 40% by weight.

3. A solvent as called for by claim 1, wherein said triisopropyltoluene is present in a quantity of between about 40% and about 70% by weight.

4. A solvent as called for by claim 1, wherein said triisopropyltoluene comprises primarily 2,4,6-triisopropyltoluene and 2,4,5-triisopropyltoluene.

5. A solvent as called for by claim 1, wherein said triisopropyltoluene comprises at least 90% by weight of the isomers 2,4,6-triisopropyltoluene and 2,4,5-triisopropyltoluene.

6. A method of solubilizing a chromogenic material, said method comprising the steps of dissolving said material in triisopropyltoluene.

7. A method as set forth in claim 6, wherein said dissolving step comprises dissolving said material in a solvent comprising at least 40% by weight triisopropyltoluene.

8. A method as set forth in claim 6, wherein said dissolving step comprises dissolving said material in a solvent comprising from about 40% to about 70% by weight triisopropyltoluene.

9. A method as set forth in claim 6, wherein said dissolving step comprises dissolving said material in a solvent comprising at least 40% by weight 2,4,6-triisopropyltoluene.

10. A method as set forth in claim 6, wherein said dissolving step comprises dissolving said material in a solvent comprising at least 40% by weight triisopropyltoluene wherein the isomer distribution is 40% to 90% 2,4,6- and 2,4,5-triisopropyltoluene.

* * * * *